Patented Nov. 20, 1951

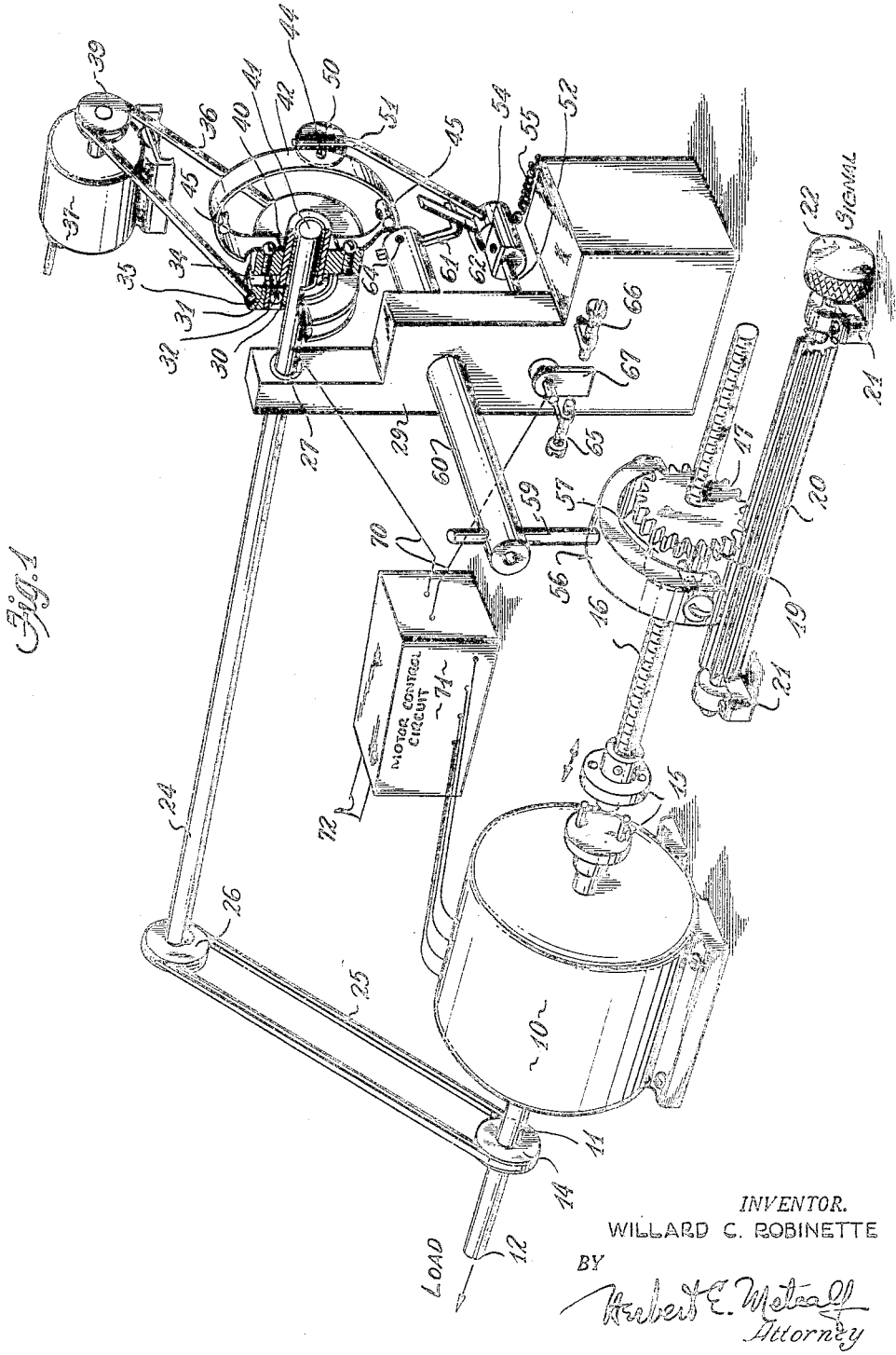

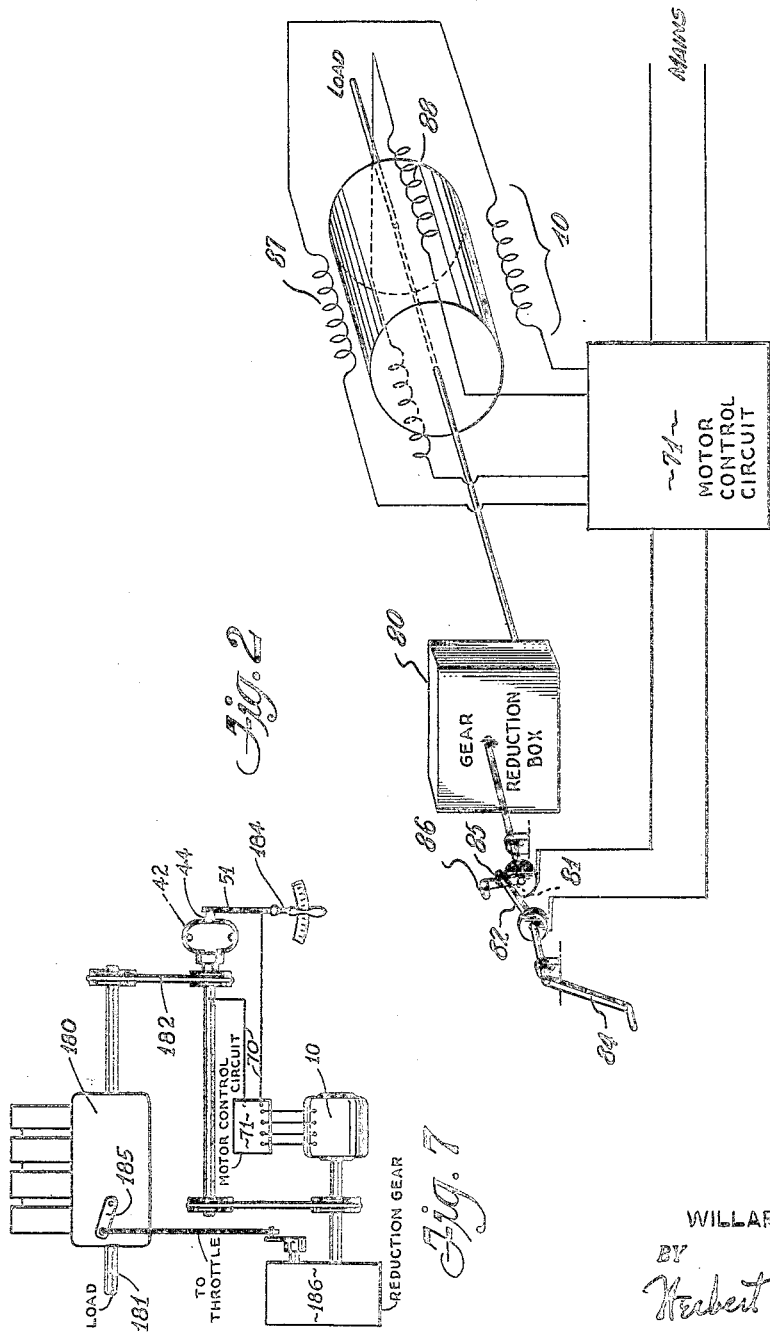

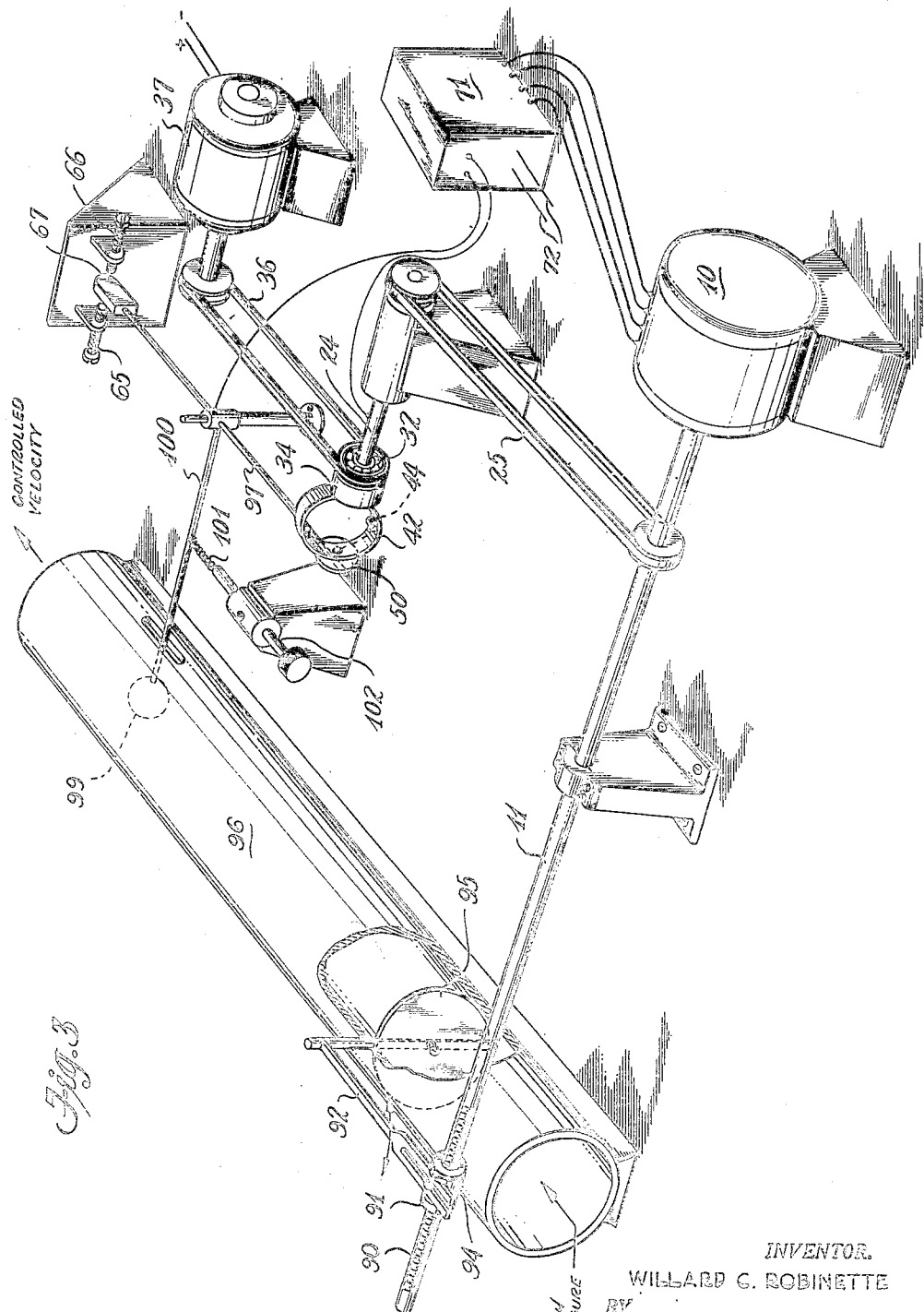

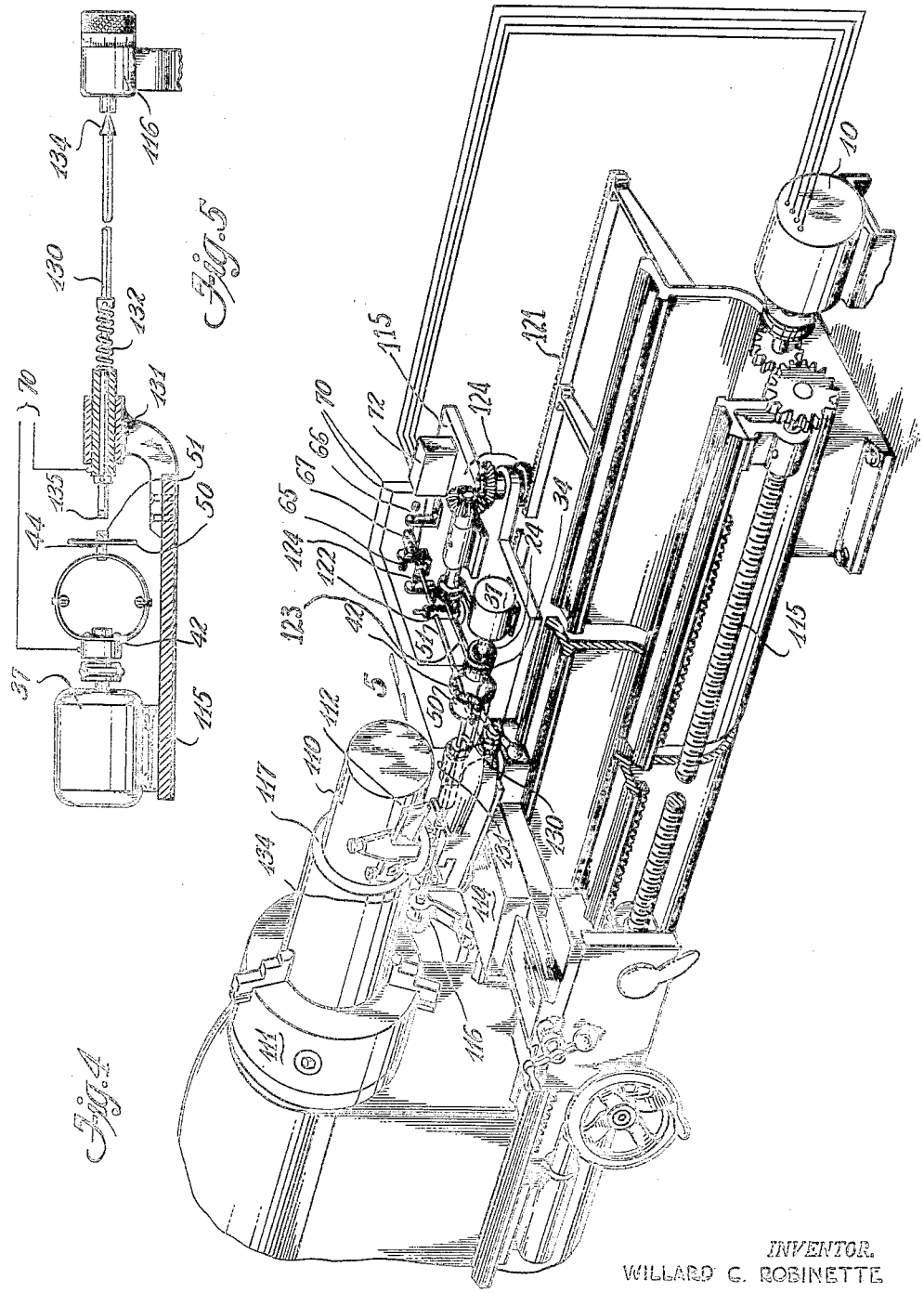

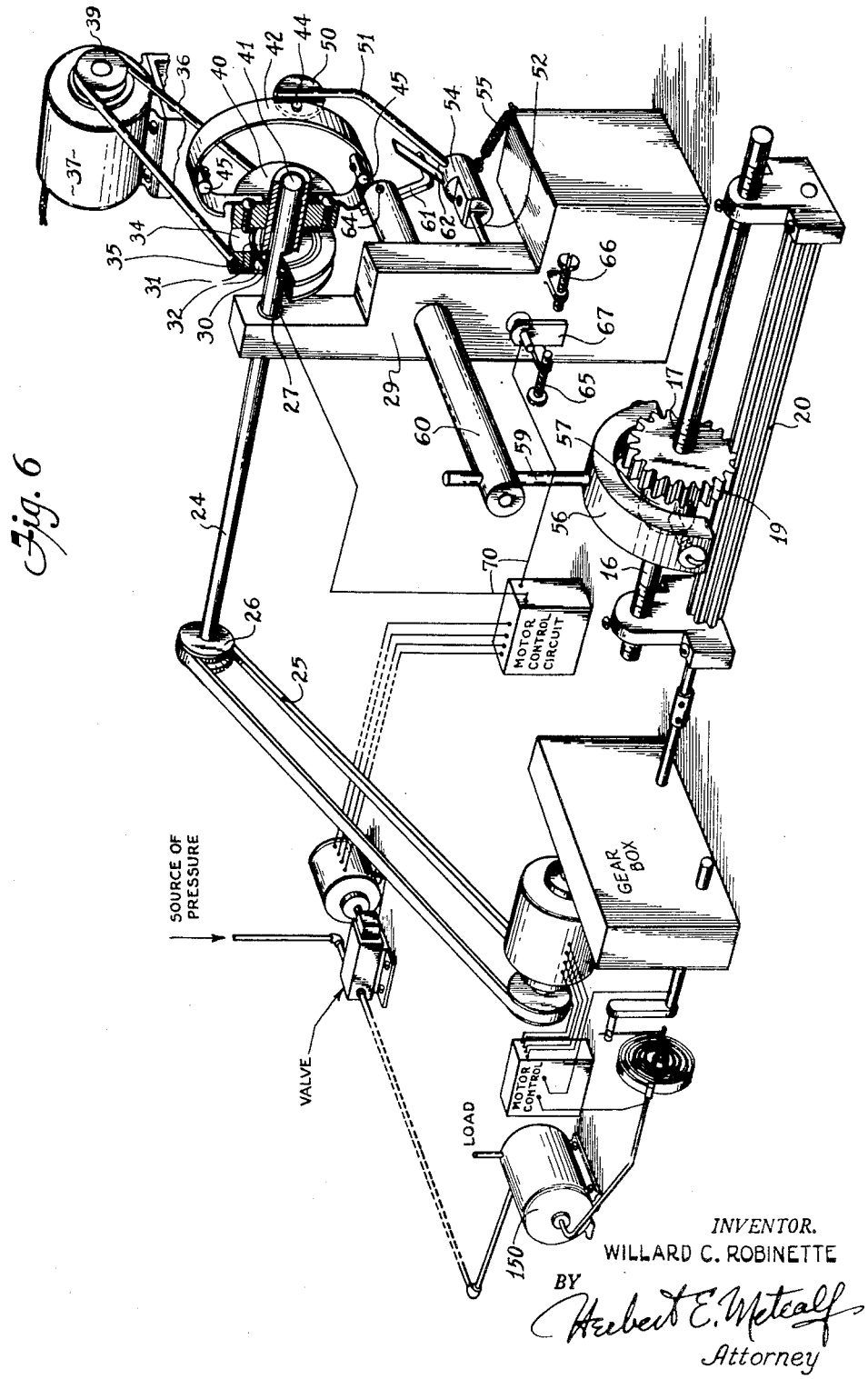

2,575,362

UNITED STATES PATENT OFFICE 2,575,362

VARIABLE-SPEED MOTOR AND SERVO MECHANISM

Willard C. Robinette, South Pasadena, Calif.

Application January 20, 1947, Serial No. 723,178

15 Claims. (Cl. 318—31)

1

My invention relates to servo-mechanisms and more particularly to a variable speed motor system adaptable for use in servo-mechanisms to control a variable and operating in such a manner that the speed, or velocity, of response is substantially directly proportional to the error, rather than in the customary manner of operating with torque proportional to the error.

The present application is a continuation-in-part of my prior application, Serial No. 476,126, filed February 16, 1943, for Electronic Control now issued as Patent No. 2,505,258.

A distinctive characteristic of a servo-system embodying the present invention is that the velocity of a translation of a controlled variable is made proportional to the error thereof, provided only that certain relationships between kinetic energy and rate of energy input be maintained. The present invention is primarily directed to be applicable to high inertia, short or medium time constant systems, and to high inertia long time constant systems, in contrast to the system described and claimed in the application cited above, which is primarily applicable to low inertia, very short time constant systems.

In order to obtain high performance servo-mechanism action of the velocity limited-error proportional type, several requirements must be satisfied within practical limits.

1. Response is to be expressed in terms of speed or velocity as by the use of a governor, or similar device;

2. The governor speed is to be substantially instantly proportional to the rate of translation of the controlled variable;

3. An error insertion device cooperating with the governor is to take a position substantially instantly proportional to the displacement of the controlled variable;

4. The cooperation of the governor and error insertion device is to control a servo-motor; and 5. The kinetic energy stored in the system at maximum system velocity is to be completely absorbed by reverse servo-motor torque in the half of the throttling range between full servo-motor speed and zero servo-motor speed so that the system arrives at a desired point with substantially zero kinetic energy.

It is an object of the present invention to provide a means and method of accomplishing the above requirements and to provide, in a high inertia, short to medium and long time constant system, a variable speed servo-mechanism of high sensitivity, and which at the same time is stable and substantially dead beat for large errors.

2

My invention will be more fully understood by reference to the description and explanation of the attached drawings which show diagrammatically several forms my invention may take.

In the drawings:

Figure 1 is a diagrammatic perspective view of one form of my invention.

Figure 2 is a diagrammatic perspective view of a follow-up system constructed in accordance with my prior patent application cited above.

Figure 3 is a diagrammatic perspective view of a flow control system embodying my invention.

Figure 4 is a diagrammatic perspective view of my invention as applied to cutting tool control.

Figure 5 is a view partly in section and partly in elevation taken as indicated by the arrow 5 in Figure 4.

Figure 6 is a diagrammatic perspective view of a long time constant system embodying the present invention.

Figure 7 is a diagrammatic view of my invention as applied to engine control.

Referring first to Figure 1, which shows diagrammatically one form the present invention may take, a servo-motor 10 preferably of the A. C. repulsion-induction type is mounted with a servo-shaft 11 extending from both ends of the motor frame. One shaft end 12 is extended to provide a load connection that can be used to operate a variable to be controlled and is also provided with a governor pulley 14. The other end of shaft 11 is extended through a pin clutch 15 and is provided with feed back threads 16 on which an internally threaded feed back pinion 17 is mounted. The outer teeth 19 of the feed back pinion mesh with an extended shaft gear 20 maintained in place by bearings 21. Rotation of shaft gear 20 will rotate feed back pinion 17 and cause it to move along motor shaft threads 16. Rotation of the servo-motor will also cause such progression, as the feed back pinion 17 is then kept from turning by the extended shaft gear 20. Thus the progression of feed back pinion 17 along the motor shaft threads is controlled both by the servo-motor rotation and by the rotation of shaft gear 20. This latter gear is one means by which a control signal is fed to the feed back pinion 17 as desired, and such feed is applied by, for example, a hand knob 22 attached to the shaft gear 20 although as will be pointed out later this knob can be operated by automatic controlling devices, for example.

Referring now to governor pulley 14 on the load end of shaft 11. This pulley is connected to a governor shaft 24 as by a governor belt 25 and governor shaft pulley 26. Governor shaft 24 is held in bearings as diagrammatically exemplified by bearing 27 in a governor support 29 preferably made of insulating material, and the shaft 24 terminates in a connection to an inner ball race 30 on which is positioned a ball retainer 31 holding, as is customary, balls 32.

An outer ball race 34 is provided, the periphery of which is provided with a belt groove 35 in which a motor feed belt 36 is positioned, this belt being driven by a governor motor 37 and pulley 39.

The retainer 31 holding balls 32 is connected to a governor plate 40 which for stability is mounted to revolve on a stub end 41 of governor shaft 24. Mounted on governor plate 40 is a substantially circular governor spring 42 of flat spring steel and positioned to extend outwardly with its axis intersecting the governor shaft axis at a right angle, so that the axis line extended from the governor shaft 24 will intersect the farthest extension of the governor spring. At that intersection point a governor spring contact 44 is mounted on spring 42. Weights 45 are positioned on governor spring 42 at opposite points to flex this spring by centrifugal force when rotated and thus move spring contact 44 over a path aligned with the governor shaft axis.

It will thus be seen that the ball bearing described will drive the governor in accordance with relative speeds and directions of rotation of both the servomotor and the governor motor. This relationship will be discussed fully later.

Opposed to governor spring contact 44 is a movable contact plate 50 mounted on a swinging arm 51 attached to an arm shaft 52 by a collar 54. Arm shaft 52 is also mounted in support 29. Movable contact plate 50 is normally forced against the governor spring contact 44 by an arm spring 55 attached to governor support 29.

The progression of pinion 17 is fed into the governor contacts by means of a feed back yoke 56 attached to pinion 17 by means of a floating ring 57.

Yoke 56 is on the end of a yoke arm 59 attached to a feed back shaft 60 passing through governor support 29 to terminate in a feed back arm 61 bearing against a flexible feed back stub 62 inserted in collar 54, this flexible stub preferably extending parallel to governor contact arm 51. In this manner, movement of pinion 17 along servomotor shaft threads 16 is transmitted to the governor arm 51 and movable contact plate 50. The length of feed back arm 61 can be varied and the arm is held at the desired length by set screw 64.

However, for reasons discussed later, speed limiting stops 65 and 66 are provided, one on each side of a limit arm 67 attached to arm shaft 52. These stops are individually adjustable to limit the swing of the governor arm and contact plate in either direction, and the flexibility of stub 62 prevents damage to arm shaft 52 when pinion 17 exceeds the outward travel limits set up by stops 65 and 66.

Arm shaft 52 which is electrically connected through governor arm 51 to contact plate 50, and the governor shaft 24 are connected by wires 70 to a motor control circuit 71, not shown in detail. This motor control circuit is connected to power mains 72 and to servomotor 10 to run the servomotor in either direction in accordance with contact or no contact of the governor spring and movable plate contacts, or to hold the servomotor in a mean radial oscillatory zero speed position at an intermediate contact condition, as has been described and claimed in my prior application cited above. The method and circuits there shown have been found satisfactory for use with the presently described invention. However, any motor control circuit capable of controlling the servomotor by means of governor contact conditions will be satisfactory when adjusted to operate the servomotor as will be described hereafter.

Before entering into an extended discussion of the present device, which operates on a velocity-error principle, a brief description first will be given of a device operating on a torque-error principle utilizing the invention of the patent cited above, as shown in the diagram of Figure 2. In this case the rotation of the servomotor 10, which is of the repulsion induction type, is used to turn a gear train 80, the output of which is used to rotate a contract arm 81. The controlling signal or error is fed in by another contact arm 82 rotatable as for example by hand crank 84. The two contacts 85 and 86 on the arms are connected to a motor control circuit 71 which in turn changes the phase excitation in the windings 87 and 88 of motor 10 to cause the motor to run in one direction when the contacts 85 and 86 are completely closed, in the other direction when the contacts 85 and 86 are completely open and to hold the motor shaft in a radial zero speed position as determined by the oscillating torque when the contacts 85 and 86 are in an intermediate condition. It is a surprising fact, as brought out in the application cited above, that with such a contact condition the motor shaft can be held in a substantially mean radial zero speed position under the control of the small oscillatory torque reversals caused by the minute variation of contact resistance between a completely firm contact and completely open circuit. In this oscillatory condition, once attained, no actual opening and closing of the contacts can be observed and the reversals are at high frequency. This type of servo-system provides a torque-error constant that closely approaches "practical infinity" in that the torque-error curve is exceedingly steep. Thus the forces involved in controlling the servomotor along the torque-error curve are exceedingly small and the shaft oscillations are too small to be transmitted to the contacts through the reduction gears in significant values. These minute oscillations are to be clearly distinguished from hunting where significant shaft rotations take place under greater variations in contact pressure.

Motion of the crank 84 will cause the servomotor 10 and connected contact to follow until the oscillatory contact condition is again obtained. This contact type of control satisfies requirement 4 above when used in the presently described invention.

However, if a given system load in the type of device of the application cited above has sufficient inertia so that maximum motor acceleration becomes too small, or if the coupling between the motor and system load is too loose, severe hunting of large amplitude and low frequency may occur. However, I have found that if the system is made to be governor controlled, so that the servomotor speed is directly proportional to the error instead of having the torque proportional to the error, stability is no longer dependent upon load inertia or coupling, within reasonable limits. The load can then be removed completely, or the relative balance between mechanical inductance and resistance can be changed without disturbing system stability. The device described and claimed herein achieves such stability within wide practical limits, as follows:

One distinctive characteristic of the system of the present invention is that the velocity of translation of the controlled variable is made to be proportional to the position error of that variable, provided only that a proper relation be maintained between system kinetic energy and rate of energy input.

To accomplish this end, and now referring back to the system of Figure 1, I first add preferably a constant rotational speed from the governor motor to the governor 42 over and above the servomotor speed, so as to provide substantial governor deflection corresponding to zero servomotor speed. This constant speed should preferably be 500 or 600 R. P. M. larger than the servomotor speed, so that when the servomotor 10 is running in a directional sense opposite to the governor motor 37 the governor still has a positive rotational speed of 500 or 600 R. P. M. minimum.

The minimum governor speed (absolute) is governor motor speed minus servomotor speed, and the maximum governor speed is governor motor speed plus servomotor speed. Thus, there is a unique governor spring contact deflection corresponding to each and every possible servomotor speed in either direction. The zero servomotor speed is determined by the position of the governor spring contact 44 under the rotation of the governor motor alone. This governor arrangement satisfies requirements 1 and 2 set forth above, within practical limits.

Assume, then that the servomotor 10 is stalled, that the movable contact plate 50 is held to be in floating contact with governor spring contact 44, that the governor motor 37 is operating at constant speed to keep the governor spring contact at a neutral point in space, and that the movable plate 50 is disconnected from the influence of the servomotor by separation of clutch members 15, with immobilization of shaft threads 16.

Under these conditions, if the movable contact plate 50 engaging the governor spring contact 44 is moved, as for example by rotation of signal knob 22, to a region where the plate is completely out of contact with the governor spring contact 44 the control circuit 71 causes the servomotor to run, up to full speed, in the negative rotational sense (i. e., in a sense subtracting from governor speed). This slower governor speed causes the governor spring contact to move outwardly, away from the zero servomotor speed position and to approach the new position of the movable contact plate 50. When this new position of the movable contact plate, away from the zero servomotor position is maintained, the governor spring contact will approach the movable contact plate 50 in its new position and would make firm contact therewith.

This contact will then reverse the torque on the servomotor and cause it to slow down. This slower servomotor speed subtracts less speed from the governor drive, so that the net result is a higher governor speed. The governor will have a lesser outward deflection and contact will be broken to reverse the torque again. When this governor spring contact deflection just matches the new position of the movable contact plate, then the servomotor will continue to run in a smooth, stable manner as determined by the torque reversals as controlled by the governor spring action, and the new position of the movable contact plate. Servomotor speed therefore is controllable by the position of contact plate 50 away from neutral position.

If, then, the movable contact plate 50 is moved in closer and closer to the governor by any means, the servomotor will run slower and slower until finally it reaches zero speed at the neutral governor deflection and arm position. This is a critical and unique relationship, and the device in this condition operates as a variable speed motor under control of signal knob 22.

From this zero speed position, further movement of the movable contact plate toward the governor spring causes the servomotor to run in the opposite (governor additive sense) direction, until full positive servomotor speed and maximum governor deflection and speed is reached. Further motion of the movable contact plate only causes forcible governor deflection. Movement of the plate in the opposite direction then causes the servomotor to run slower and slower until the neutral position is again reached.

In adapting such a governor controlled variable speed to a servo-control system as illustrated, the basic arrangement is to have the movable contact plate 50 movable in either direction by the servomotor output shaft or by the variable.

Assume that the movable contact plate is now geared to be moved by rotation of the servomotor shaft by engagement of pin clutch 15, and that the movable contact plate 50 is moved by hand knob 22 in the direction to cause the governor contacts to be opened.

With the opening of the governor contacts, the servomotor starts to rotate in a negative direction, as explained above. In consequence, the governor starts to slow down. The governor spring contact 44 then moves outwardly toward the new position of the movable contact plate 50.

When the new contact is made, the servomotor will run at a speed corresponding to the deflection position of the movable contact plate 50 from the zero servo speed condition. This position, however, will not be the position to which the movable plate 50 was first moved, because as the servomotor rotates, it is progressing pinion 17 along servomotor shaft threads 16, which returns the movable contact plate 50 towards the zero servomotor speed position, and contact is made and broken to give progressively lower and lower servomotor speed as the movable plate 50 approaches the neutral position. At this point the system remains again quiet and stable at zero servomotor speed. Any small excursion in either direction from this zero point will slowly move the system (by governor control) back toward the zero point. Thus, when a given signal is inserted into the system through hand knob 22, the system responds to move the load a proportional amount but at slower and slower velocities as the zero servomotor speed position is reached. This arrangement satisfies requirement 3, set forth above.

Thus, there can be no hunting or oscillating, even if the load is removed from the motor, or if the inertia of the load changes, a common fault of other servo-systems.

It should be observed that the "width" of the neutral, or position of zero servomotor speed, is exceedingly small because it is apparently dependent on the molecular average contact between the movable contact and the governor spring contact and is hence theoretically as sensitive as the straight contact servo system described and claimed in the application cited above. Practically, however, this is not quite true, because the governor spring contact is rotating and this contact point vibrates sufficiently to give a small "zone" of contact a fraction of a thousandth of an inch wide, in place of a true molecular film contact. For most uses, however, this zone is too small to affect accuracy.

It will thus be seen that when a signal is inserted into the system by moving pinion 17 along shaft threads 16 when the servomotor is at zero speed, the response is velocity proportional to the degree of signal inserted, and the servomotor itself returns the system to the zero speed balance point by returning the pinion 17 to its original position on shaft threads 16. In the meantime, the rotation of the servomotor has corrected load conditions proportional to the signal inserted.

It should again be noted that the governor balance point is determined by the governor motor speed at the point of zero servomotor speed, rather than by the servomotor and attached load arriving at any certain deflection position as measured by the inserted signal. Mathematically, other servo systems determine motor orders primarily from angular position as the primary variable, and achieve stability by adding in control signals derived from first derivative (or speed of system) and, in some cases, second derivative (or acceleration) control voltages. It contrast, the governor control of the present invention utilizes the first derivative (speed) to control the servomotor. Since the most highly sought of all servo characteristics (after accuracy) is smoothness, it follows that controlling the speed by means of the governor is a great advantage.

By suitably restricting the actual end travel of the movable contact plate 50 in either direction, the maximum velocity of a controlled variable transiated by the servomotor can be limited to any desirable fraction of full servomotor speed translation in spite of the instant condition of a very large control signal. Thus the system can never "run away" faster than desired. This is a positive check against the occurrence of hunting and instability.

This desirable restriction is obtained in the present instance by the use of limiting arm 67 and limit stops 65 and 66 mounted on arm shaft 52. As the position of movable contact 50 depends on the angular position of arm 51 and as shaft 60 through adjustable arm 61' controls the position of arm 51, the stops 65 and 66 restrict the angular movement of contact 50.

By changing the length of adjustable arm 61 a given control signal as inserted by movement of hand knob 22 can be made to call for a wide range of governor speed settings. The arm length ratios can be set so that a relatively small control signal can cause a relatively large motion of the movable contact plate 50 and hence cause a relatively high speed rotation of the servomotor. Conversely, if the arm 61 length is made small, it will require a relatively large control signal to cause a similar speed change. Obviously, if the linkage is small enough the movement of the movable contact plate 50 will not be sufficient to permit the servomotor to run at full speed even when maximum control signal is inserted.

Thus by varying the length of arm 61 the system can be made of extreme sensitivity, or sluggish in action, as desired.

However, when arm 61 is made to insert maximum control signal sensitivity into the system the velocity response may be far beyond the limiting sensitivity for stability. In this condition the system will, of course, hunt violently. In consequence, stops 65 and 66 are used in order to limit the maximum servo-motor velocity in either direction to a value that will prevent hunting due to high motor velocities. In this condition, the system is then extremely sensitive to small control signals, yet remains stable and dead beat for large control signals. Thus, requirement 5, above, has been satisfied.

It is to be noted that it is not necessary that the limit stops 65 and 66 be adjusted to permit equal speeds in both directions. The speed limiting stops 65 and 66 are not extended more than necessary to insure accurate process control, and the most critical direction of operation is generally selected for the slowest speed.

It is clear from the above description that the system so far described can be used as a variable speed device for disconnecting pin clutch 15 or as a follow-up system when clutch 15 is engaged. It should also be noted that as the speed of governor motor 31 determines the zero servomotor speed position, changes in governor motor speed will change the zero servomotor speed position and in consequence change the load position.

This leads to another way of inserting a controlling signal, that can be used alone if desired, or used to insert a desired correction or variation of a position signal inserted by hand knob 22. Also, by use of governor motor speed control, the point can be placed at the middle of the throttling range or otherwise, as desired.

It is also clear that in addition to operating as a follow-up system, the system is also a torque amplifier, as the energy required to insert a position signal through knob 22 is exceptionally small as compared to the output of the servomotor. Likewise, the energy utilized in rotating governor motor 37 is small as compared with servomotor power.

The use of the system of the present invention as modified to control a variable in proportion to eror is shown in Figure 3.

Here the servomotor shaft 11 is connected through threads 90 and nut 91 to operate an arm 92 through pin 94. Arm 92 in turn operates a throttle valve 95, in, for example, a pipe 96 carrying air which is to be delivered at a controlled velocity. As above described, the servomotor 10, governor drive motor 37, and governor spring 42 are used. In this case, however, movable contact plate 50 is mounted on a pivoted arm 97 which is moved directly by a drag sphere 99 positioned in pipe 96 through sphere arm 100. A limit arm 67 and limit stops 65 and 66 as before are provided to control the maximum eror insertion. An adjustable spring tension on drag sphere arm 100 against air pressure is provided by spring 101 and adjustment shaft 102.

To set this system in operaton, it is only necessary to adjust the spring tension on sphere arm 100 and the setting of throttle 95 to provide the output velocity desired with the servomotor stationary in stalled condition, and to adjust stops 65 and 66 to provide stability in accordance with pressure fluctuations being encountered. Under these conditions any fluctuations in air velocity from the velocity selected will be automatically corrected.

The modification just above described is typically illustrative of operation of the device of the present invention as a velocity limited-error proportional servo-mechanism. Other adaptations of the device for specific purposes will be apparent to those skilled in the art from the above description.

Another modification of the servo-mechanism herein described is diagrammatically shown in Figures 4 and 5, illustrating how the length of cut to be taken by a cutting tool on a work piece can be accurately controlled.

In this case the work piece 110 is mounted in the usual manner in a lathe chuck 111 and the cutting tool 112 is held at the desired angle on cross-head 114. Cross-head 114 supports a servo shelf 115, so that the shelf moves with the tool. The servomotor 10 is connected to rotate lead screw 115 of the lathe and thereby progress the cross-head and tool to make the cut desired.

An adjustable stop 116 is provided, solidly supported at one side of the work piece. As an example, it is assumed that the work piece is to have a shoulder 117 formed thereon which is to be accurately located. It is also assumed that the depth of the shoulder can be made with one cut of the tool.

Mounted on shelf 115 is the modified servo-mechanism. As servomotor 10 does not move and the shelf does, the motion of the tool can be transmitted directly to the governor ball race 34 by means of gearing 120 mounted on shelf 115 and driven by rack 121 mounted on the lathe. The motion of the gears is then transmitted to the governor by belt 123. Thus the governor is directly driven by the variable—in this case, the tool motion—and also by constant speed governor motor 37, as described above.

For extreme accuracy it is desirable to avoid rotating contact between the error contact and the governor spring contact, to remove vibration. Consequently, movable contact plate 50 is mounted on plate arm 51 to pivot on support 122 and arm 51 is extended to terminate limit arm 67 flanked by limit stops 65 and 66. An arm spring 124 is placed to force movable plate 50 at all times lightly against governor spring contact 44. As shown more clearly in Figure 5, a feeler rod 130 is provided, mounted on feeler support 131 coaxial with governor shaft 1 and urged outwardly, by spring 132, toward adjust stop 116, although feeler tip 134 of rod 130 does not have to touch stop 116 except as the tool approaches the shoulder 117.

Connections to servomotor control circuit 72 are made to rod 130 and governor ball race 34, with no direct connection to movable plate 50. Movable plate 50 is, however, positioned between governor contact point 44 and rod contact 135. Rod 130 is urged outwardly toward stop 116 by rod spring 132 at all times.

The system is set up so that the servomotor 10 is in the mean radial oscillatory zero speed condition with feeler tip 134 against stop 116 and with rod contact 135 contacting movable plate 50 which, as before stated, is urged by arm spring 124 against governor spring contact 44 at all times. The servomotor control contacts therefore do not rotate and the torque reversals take place over an exceptionally minute movement of the contact, giving an accuracy similar to that of the device of Figure 2.

In operation the tool is moved by hand to position for the cut to begin. This movement permits rod 130 to draw away from contact with movable plate 50 and sets up conditions to rotate the servomotor at the desired speed to make the cut. As the cut is being made, feeler point 134 first touches the stop 116 which has been set for the length of cut desired. As the cut continues, feeler rod 130 is forced toward movable plate 50 which is, of course, in a position as determined by the position of governor spring contact 44. The servomotor slows down, cuts less and less from the stock as the zero servomotor speed position of the governor spring contact 44 is approached, and the tool ceases to progress entirely at that point. Thus, the length of the cut is accurately determined by stop 116. Very delicate finishing cuts can be taken thereafter, for example, by small changes in the position of stop 116, if desired.

The diagrammatic system, as shown, is merely illustrative of an accurate positioning operation. Other arrangements to stop a member of any kind accurately at a desired point will be obvious to those skilled in the art, using the modification of the system of the present invention just above described.

In many cases a change in energy input by the servomotor may require several seconds or minutes for the error measuring system to reflect the changed input conditions. Hence, the governor would not, in the system described above, represent the instantaneous velocity of the controlled variable and a slow hunting of the controlled variable would result.

The speed adjustment stops mentioned above may, however, for relief of such hunt conditions, reduce the motor speed to such a point that the response of the system is too sluggish. Under these circumstances sometimes the speed of the motor in one direction only can be limited, leaving the servomotor in the opposite direction at its maximum. Then a limit switch can be placed on the variable control (such as a valve) to cut off the motor in the high speed direction after a predetermined corrective movement. The limit switch thus cooperates with the governor to limit the high speed excursions of the hunt motion to the smallest reasonable value allowable. This expedient becomes less and less satisfactory as the time constant of the controlled system becomes longer.

Another solution of the hunt problem is to make the governor speed conform to the velocity of the controlled variable rather than to the velocity of the servomotor. In this case the feedback should also come directly from the controlled variable. This is satisfactory when the controlled variable has sufficient energy in the proper form to actuate the governor and feedback device.

However, certain controls require that the error indication be taken from delicate indicating instruments such as, for example, gyroscopes, galvanometers, Bourdon tube movements, etc., which do not have sufficient power to operate the governor. In this case, the follow-up system shown in Figure 2 can be used to provide governor rotation.

A long time constant system with sensitive error indication is exemplified in Figure 6, where the fluid pressure in a system 150 requiring varying quantities of fluid through a long pipe line 151, is supplied by a gate valve 152 from a source of higher pressure 154. Pressure in the system 150 is registered by a Bourdon tube 155 for example which actuates an arm contact 156 opposed to a gear arm contact 157 driven by a reduction gear box 159. This gear box is rotated by an auxiliary servomotor 160 under the control of arm contacts 156 and 157 through auxiliary motor control 161 as in the device shown in Figure 2.

An error shaft 162 is also driven by the gear box 159 to actuate movable contact 50 as in the embodiment of Figure 1. In this case, however, the governor is driven from the auxiliary servomotor 160. The governor contacts are connected to main servomotor control 71 which in turn actuates main servomotor 10 which actuates gate valve 152.

This type of system is applied to a variable which does not have sufficient force to permit gearing the governor directly to the variable as was done in the device of Figure 4. In either case, where a medium long time constant system is involved, driving the governor and taking the error from the variable produces substantially dead beat, non-hunting operation consistent with maximum speed response.

There are instances where the variable itself is rotating and it is desired to maintain, for example, a constant speed under varying load. In this case, of course, if the governor be driven by the variable, the governor contact will reflect both the speed of the variable and deviation from the desired speed and no separate constant speed governor motor will be needed. This condition is illustrated by the block diagram of Figure 7 where, for example, an internal combustion engine is to be controlled.

Here, the engine 180 drives its load through engine shaft 181 and also drives governor spring 42 directly through belt 182 and the ball bearing as heretofore described. Movable contact 51 is mounted to oppose the governor spring contact 44. Movable contact 51 is mounted on a pivoted throttle arm 184, and the ball bearing is also driven from the servomotor 10 described above. The governor contacts are connected as before to motor control circuit 70 which in turn controls the servomotor 10 connected to operate the throttle 185 of the engine 180 through reduction gear 186. With the governor contacts set to hold the servomotor at zero speed at the desired opening of the throttle to provide a desired R. P. M., the contacts will open or close in accordance with deviation of the R. P. M. from the standard set, with consequent throttle operation without hunting, to correct the error. Changes in speed are made with movements of arm 184. Thus, my invention is applicable to both static and dynamic systems of all types.

Synchronization of two engines is simple. One engine can be set at a desired speed by means of the control just above described. The other engine will use the same control device except that throttle arm 184 is moved by an indication of difference in R. P. M. Such indication can be made, for example, by opposing the outputs of tachometer generators, one for each engine; the amount and sense of the mixed tachometer outputs is then applied to move the throttle arm 184 of the second engine.

It is to be understood that I do not limit myself to the particular forms or devices described above and illustrated in the drawings. Thus, for example, other means will be readily apparent to those skilled in the art for mixing the signal or control motion with feedback from the variable such as, for example, an epicyclic gear or other differential devices. Furthermore, the speeds of the governor motor and the servomotor can be mixed in proper sense by other devices such as, for example, by mounting the governor motor axially on the servo-shaft to mix the rotation of the two motors, with the governor spring mounted on the governor motor shaft. Other types of governors may be used, and other types of power mechanisms capable of running in either direction under electric control can be used as motors. Thus, the term motor is not to be limited to electrically energized rotational power sources. Such devices and others performing the functions as set forth herein are recognized equivalents and are properly adaptable to the devices exemplifying the invention described herein.

I claim:

1. In a mechanism including a motor capable of running in either direction and a control circuit for operating said motor in a direction in accordance with the complete opening or firm closure of a pair of electrical contacts, means for obtaining a variable speed motor response comprising a governor, means for rotating a member in one direction only, means for rotating said governor in accordance with the resultant of the sense and speed of said motor and said member, a first electrical contact on said governor, a second electrical contact cooperating with said governor contact, said contacts being connected to said motor control circuit, and signal insertion means for moving said second electrical contact toward or away from said first electrical contact to provide variable speed operation of said motor.

2. In a servo-mechanism including a power source and motor capable of running in either direction and a control circuit for operating said motor in a direction in accordance with the complete opening or firm closure of a pair of electrical contacts, means for controlling a variable comprising a governor means for rotating a member in one direction only, means for rotating said governor in accordance with the resultant of sense and speed of said motor and said member, a first electrical contact on said governor, a second electrical contact cooperating with said governor contact, said contacts being connected to said motor control circuit to hold said motor in stalled torque condition at the governor contact position as determined by the rotation of said governor by said member only, a variable to be controlled, a variable controlling device operated by said motor, error insertion means for moving said second electrical contact toward or away from said first electrical contact in a sense and by an amount proportional to an error in said variable away from a desired condition to cause a motor motion correcting the error, and means for limiting the amount of movement of said contact in either direction to control the maximum speed of the variable.

3. In a servo-mechanism including a power source and motor capable of running in either direction and a control circuit for operating said motor in a direction in accordance with the complete opening or firm closure of a pair of electrical contacts, means for controlling a variable comprising a governor, means for rotating a member in one direction only, means for rotating said governor in accordance with the resultant of the sense and speed of said motor and said member, a first electrical contact on said governor, a second electrical contact cooperating with said governor contact, said contacts being connected to said motor control circuit to hold said motor in stalled torque condition at the zero motor speed governor rotation, a variable to be controlled, a variable controlling device operated by said motor, error insertion means for moving said second electrical contact toward or away from said first electrical contact in a sense and by an amount proportional to an error in said variable away from a desired condition to cause a motor motion correcting the error, and means for limiting the amount of movement of said contact in either direction to control the maximum speed of the variable.

4. In a servo-mechanism including a power source and motor capable of running in either direction and a control circuit for operating said motor in a direction in accordance with the complete opening or firm closure of a pair of electrical contacts, means for controlling a variable comprising a governor, means for rotating a member in one direction only, means for rotating said governor in accordance with the resultant of the sense and speed of said motor and said member, a first electrical contact on said governor, a second electrical contact cooperating with said governor contact, said contacts being connected to said motor control circuit to hold said motor in stalled torque condition at the zero motor speed governor rotation, a variable to be controlled, a variable controlling device operated by said motor, and error insertion means for moving said second electrical contact toward or away from said first electrical contact in a sense and by an amount proportional to an error in said variable away from a desired condition to cause a motor motion correcting the error.

5. In a servo-mechanism including a motor capable of running in either direction and a control circuit for operating said motor in a direction in accordance with the complete opening or firm closure of a pair of electrical contacts, means for controlling a variable comprising a governor, means for rotating a member in one direction onyl, means for rotating said governor in accordance with the resultant of the sense and speed of rotation of said motor and said member, a first electrical contact on said governor, a second electrical contact cooperating with said governor contact, a variable to be controlled, a variable controlling device operated by said motor, error insertion means for moving said second electrical contact toward or away from said first electrical contact in a sense and by an amount proportional to an error in said variable away from a desired condition to cause a motor rotation correcting the error, and means for differentially limiting the amount of movement of said contact to differentially control the maximum speed of motor response in either direction.

6. In a servo-mechanism including a motor capable of running in either direction and a control circuit for operating said motor in a direction in accordance with the complete opening or firm closure of a pair of electrical contacts, means for controlling a variable comprising a governor, means for rotating a member in one direction only, means for rotating said governor in accordance with the resultant of the sense and speed of said motor and said member, a first electrical contact on said governor, a second electrical contact cooperating with said governor contact, said contacts being connected to said motor control circuit, a variable to be controlled, a variable controlling device operated by said motor, means operated by the controlled variable for moving said second electrical contact toward or way from said first electrical contact to provide operation of said motor in sense and speed to hold said variable in a desired condition.

7. In a mechanism including a motor capable of running in either direction and a control circuit for operating said motor in a direction in accordance with the complete opening or firm closure of a pair of electrical contacts and for holding the shaft of said motor in a zero speed position when said contacts are lightly engaged, means for obtaining a variable speed motor response comprising a governor, means for rotating a member in one direction only, means for rotating said governor in accordance with the resultant of the sense and speed of rotation of said motor and said member, a first electrical contact on said governor, a second electrical contact cooperating with said governor contact, said contacts being connected to said motor control circuit, and signal insertion means for moving said second electrical contact toward or away from said first electrical contact to provide variable speed operation of said motor.

8. In a servo-mechanism including a servo-motor capable of running in either direction and a control circuit for operating said motor in a direction in accordance with the complete opening or firm closure of a pair of electrical contacts and for holding said motor in a zero speed position when said contacts are lightly engaged, means for obtaining a variable speed motor response comprising a governor, means for rotating a member in one direction only, means for rotating said governor in accordance with the resultant of the sense and speed of rotation of said motor and said member, a first electrical contact on said governor, a second electrical contact cooperating with said governor contact, said contacts being connected to said motor control circuit, means for moving said second electrical contact toward or away from said first electrical contact to provide variable speed operation of said motor and feed back means actuated as a result of motor rotation to return said contacts to a position creating zero speed of said motor.

9. In a servo-mechanism including a motor capable of running in either direction and a control circuit for operating said motor in a direction in accordance with the complete opening or firm closure of a pair of electrical contacts and for holding said motor in a zero speed condition when said contacts are lightly engaged, means for controlling a variable comprising a governor, means for rotating a member in one direction only, means for rotating said governor in accordance with the resultant of the sense and speed of rotation of said motor and said member, a first electrical contact on said governor, a second electrical contact cooperating with said governor contact, said contacts being connected to said motor control circuit to hold said motor in zero speed condition at the constant speed governor rotation, a variable controlled by said motor, and error insertion means for moving said second electrical contact toward or away from said first electrical contact in a sense and by an amount proportional to an error in said variable away from a desired condition, to cause a motor rotation correcting the error.

10. In a servo-mechanism including a motor capable of running in either direction and a control circuit for operating said motor in a direction in accordance with the complete opening or firm closure of a pair of electrical contacts and for holding said motor in a zero speed condition when said contacts are lightly engaged, means for controlling a variable comprising a governor, means for rotating a member in one direction only, means for rotating said governor in accordance with the resultant of the sense and speed of rotation of said motor and said member, a first electrical contact on said governor, a second electrical contact cooperating with said governor contact, said contacts being connected to said motor control circuit to hold said motor in zero speed condition at the constant speed governor rotation, a variable controlled by said motor, error insertion means for moving said second electrical contact toward or away from said first electrical contact in a sense and by an amount proportional to an error in said variable away from a desired condition to cause a motor rotation correcting the error, and means for limiting the amount of movement of said contact in either direction to control the maximum speed of the motor.

11. In a servo-mechanism including a motor capable of running in either direction and a control circuit for operating said motor in a direction in accordance with the complete opening or firm closure of a pair of electrical contacts and for holding said motor in a zero speed condition when said contacts are lightly engaged, means for controlling a variable comprising a governor, means for rotating a member in one direction only, means for rotating said governor in accordance with the resultant of the sense and speed of rotation of said motor and said member, a first electrical contact on said governor, a second electrical contact cooperating with said governor contact, said contacts being connected to said motor control circuit to hold said motor in zero speed condition at the constant speed governor rotation, a variable controlled by said motor, error insertion means for moving said second electrical contact toward or away from said first electrical contact in a sense and by an amount proportional to an error in said variable away from a desired condition to cause a motor rotation correcting the error, and means for differentially limiting the amount of movement of said second contact to differentially control the maximum speed of motor response in either direction.

12. In a mechanism including a motor capable of running in either direction and a control circuit for operating said motor in a direction in accordance with the complete opening or firm closure of a pair of electrical contacts and for holding said motor in a zero speed condition when said contacts are lightly engaged, means for controlling a variable comprising a governor, means for rotating a member in one direction only, means for rotating said governor in accordance with the resultant of the sense and speed of rotation of said motor and said member, a first electrical contact on said governor, a second electrical contact cooperating with said governor contact, said contacts being connected to said motor control circuit to hold said motor in zero speed condition at the constant speed governor rotation, a load to be controlled connected to said motor, signal insertion means for moving said second electrical contact toward or away from said first electrical contact to provide variable speed operation of said motor and said load in sense and speed in accordance with the direction and amount of movement of said signal insertion means, and means operated by movement of said load to return said second contact to its original position at a predetermined load condition.

13. In a mechanism including a motor capable of running in either direction and a control circuit for operating said motor in a direction in accordance with the complete opening or firm closure of a pair of electrical contacts and for holding said motor in a zero speed condition when said contacts are lightly engaged, means for controlling a variable comprising a governor, means for rotating a member in one direction only, means for rotating said governor in accordance with the resultant of the sense and speed of rotation of said motor and said member, a first electrical contact on said governor, a second electrical contact cooperating with said governor contact, said contacts being connected to said motor control circuit to hold said motor in zero speed condition at the constant speed governor rotation, a load to be controlled connected to said motor, signal insertion means for moving said second electrical contact toward or away from said first electrical contact to provide variable speed operation of said motor and said load in sense and speed in accordance with the direction and amount of movement of said signal insertion means, means operated by movement of said load to return said second contact to its original position at a predetermined load condition, and means for differentially limiting the amount of movement of said second contact to differentially control the maximum speed of motor response in either direction.

14. In a mechanism including a servo-motor capable of running in either direction and a servo-motor control circuit for operating said servo-motor in a direction in accordance with the complete opening or firm closure of a pair of electrical contacts and for holding said servo-motor in a zero speed condition when said contacts are lightly engaged, means for obtaining a variable speed servo-motor response comprising a governor, a governor motor connected to rotate a member in one direction only, means connected to rotate said governor in accordance with the resultant of the sense and speed of rotation of said servo-motor and said governor motor, a first electrical contact on said governor, a second electrical contact cooperating with said governor contact, said contacts being connected to said servo-motor control circuit, and signal insertion means for moving said second electrical contact toward or away from said first electrical contact to provide variable speed operation of said servo-motor.

15. In a servo-mechanism including a servo-motor capable of running in either direction and a control circuit for operating said motor in a direction in accordance with the complete opening or firm closure of a pair of electrical contacts and for holding said motor in a zero speed condition when said contacts are lightly engaged, means for controlling a load comprising a governor, means for rotating a member in one direction only, means for rotating said governor in accordance with the resultant of the sense and speed of rotation of said motor and said member, a first electrical contact on said governor, a conductive member resiliently pressed against said governor contact to follow the movement thereof, a second electrical contact opposed to said conductive member and positioned in accordance with a predetermined load condition, said contacts being connected to said motor control circuit to hold said motor in zero speed condition at the constant governor speed rotation through said conductive member, and means for limiting the movement of said conductive member in either direction.

WILLARD C. ROBINETTE.

(References on following page)

REFERENCES CITED

The following references are of record in the file of this patent:

UNITED STATES PATENTS

| Number | Name | Date |
|---|---|---|
| 385,259 | Fiske | June 26, 1888 |
| 469,257 | Leber | Feb. 23, 1892 |
| 922,175 | Meckelburg | May 18, 1909 |
| 1,684,132 | Hewlett et al. | Sept. 11, 1928 |
| 1,684,137 | Mittag | Sept. 11, 1928 |
| 2,025,122 | Poitras et al. | Dec. 24, 1935 |
| 2,113,436 | Williams | Apr. 5, 1938 |
| 2,115,834 | Young | May 3, 1938 |
| 2,148,731 | Davis et al. | Feb. 28, 1939 |
| 2,172,064 | Harrison | Sept. 5, 1939 |
| 2,284,817 | Harrison | June 2, 1942 |
| 2,292,937 | Harrison | Aug. 11, 1942 |
| 2,361,790 | Noxon | Oct. 31, 1944 |
| 2,362,197 | Garrett | Nov. 7, 1944 |
| 2,403,605 | Lesnick | July 9, 1946 |